UNITED STATES PATENT OFFICE.

THOMAS GARE, OF NEW BRIGHTON, ENGLAND.

MANUFACTURE AND REPAIR OF INDIA-RUBBER GOODS.

967,751.     Specification of Letters Patent.     Patented Aug. 16, 1910.

No Drawing.     Application filed August 27, 1906. Serial No. 332,103.

*To all whom it may concern:*

Be it known that I, THOMAS GARE, subject of Great Britain, residing at New Brighton, in the county of Chester, Kingdom of Great Britain, have invented new and useful Improvements in the Manufacture and Repairing of India-Rubber Goods, of which the following is a specification.

The present invention comprehends the provision of a process of manufacturing rubber goods from old or waste vulcanized rubber, without the addition of sulfur.

It comprises essentially the subjection of the rubber in a suitably reduced state to a high degree of cold compression in a mold, whereby the rubber is formed into a compact mass and the air expelled therefrom and from the mold; and the subsequent treatment of the rubber, while still under pressure in the mold, to the action of heat above the ordinary temperature of vulcanization, so as to render the rubber plastic and to cause it to thoroughly fuse.

In practice, the old or waste rubber in a dry state is cut into pieces of suitable size, (if preferred, it may be powdered), and is then placed in a mold of the proper size and shape for the goods to be produced. The material in the mold is then subjected to a high degree of cold compression, in practice half a ton to the square inch, and where great density or compactness is a desideratum, such pressure may be exceeded. This operation, as will be apparent, forms the material into a compact mass, and causes it at the same time to assume the required shape; it has, also, the further and more important effect of expelling the air from the material and from the mold. The mold, with the material still confined therein under the desired pressure, is placed in a heated chamber, or otherwise subjected to heat, at a temperature well over the ordinary temperature of vulcanization. Such temperature may vary, of course, according to the character of the waste used, but experiments have proven that the best results are obtained between the limits of 350° and 450° F. The duration of the heating likewise may vary from twenty minutes to one and one-half hours, according to the size of the article and the thickness of the mold. As a result of this operation, the material will be reduced to a plastic state, and will be thoroughly fused.

At the completion of the heating operation, the molded object is allowed to cool in the mold while still under pressure, and when removed therefrom will be completely finished.

I claim as my invention:

A process for the manufacture of rubber goods which consists in subjecting waste rubber, without the addition of sulfur, to cold compression in a mold, to form the rubber into a compact mass, and to expel all air from the same and from the mold; and in then subjecting the rubber, while still under pressure in said mold, to the action of heat at a temperature between 350° and 450° F., according to the character of the waste, to render the rubber plastic and to cause it to thoroughly fuse.

In testimony whereof I have signed my name to this specification in the presence of two subscribing witnesses.

THOMAS GARE.

Witnesses:
    ALFRED BOSSHARDT,
    STANLEY E. BRAMALL.